United States Patent [19]
Dodt et al.

[11] Patent Number: 5,487,171
[45] Date of Patent: Jan. 23, 1996

[54] SYSTEM FOR READING AND STOPPING READING DATA FROM MAGNETIC TAPE INTO MEMORY IN RESPONSE TO MOUNT COMMAND AND WRITE COMMAND RESPECTIVELY FROM THE SYSTEM PROCESSOR

[75] Inventors: William C. Dodt, Broomfield; Terry R. Gottehrer, Louisville; Charles A. Milligan, Golden, all of Colo.

[73] Assignee: Storage Technology Corporation, Louisville, Colo.

[21] Appl. No.: 947,204

[22] Filed: Sep. 18, 1992

[51] Int. Cl.$^6$ .................................................. G06F 15/02
[52] U.S. Cl. ........................ 395/840; 395/250; 395/427; 364/236.4; 364/239.6; 364/268.1; 364/DIG. 1
[58] Field of Search ..................................... 395/275, 250, 395/375, 550, 425, 500; 364/133, 229.2, 263, 263.1, 948, 236.4, 239.6, 268.1, 943.92, 948.3, 952.6, 955.4, 957.9, 971, 971.1

[56] References Cited

U.S. PATENT DOCUMENTS

| | | | |
|---|---|---|---|
| 4,410,942 | 10/1983 | Milligan et al. | 364/200 |
| 4,435,762 | 3/1984 | Milligan et al. | 364/200 |
| 4,467,421 | 9/1984 | White | 364/200 |
| 4,602,331 | 7/1986 | Sheth | 364/200 |
| 4,607,348 | 8/1986 | Sheth | 364/200 |
| 4,742,485 | 5/1988 | Carlson et al. | 364/900 |
| 4,752,777 | 6/1988 | Franaszek | 340/825.79 |
| 4,788,641 | 11/1988 | Ishiguro et al. | 364/200 |
| 4,926,324 | 5/1990 | Yamamoto et al. | 364/200 |
| 4,933,840 | 6/1990 | Sera et al. | 364/200 |
| 4,980,818 | 12/1990 | Shinmura | 364/200 |
| 5,008,808 | 4/1991 | Fries et al. | 364/200 |
| 5,210,829 | 5/1993 | Bitner | 395/250 |
| 5,261,058 | 11/1993 | Squires et al. | 395/275 |
| 5,327,535 | 7/1994 | Ogata et al. | 395/275 |

*Primary Examiner*—Thomas C. Lee
*Assistant Examiner*—Moustafa M. Meky
*Attorney, Agent, or Firm*—Duft, Graziano & Forest

[57] ABSTRACT

In response to the mounting of a magnetic tape on the tape drive, the tape drive begins reading data from the tape into the preload buffer while concurrently signalling the data processor that the tape drive is instantaneously available to read/write data. The data processor can then begin the data transfer operation without incurring the delay occasion by media set up time. The data that is transferred from magnetic tape is stored in the preload buffer in anticipation of the data processor issuing a data read command. Upon receipt of the data read command, the tape drive reads the data out of the preload buffer to the data processor via the data channel while simultaneously reading data from the magnetic tape into the preload buffer.

18 Claims, 5 Drawing Sheets

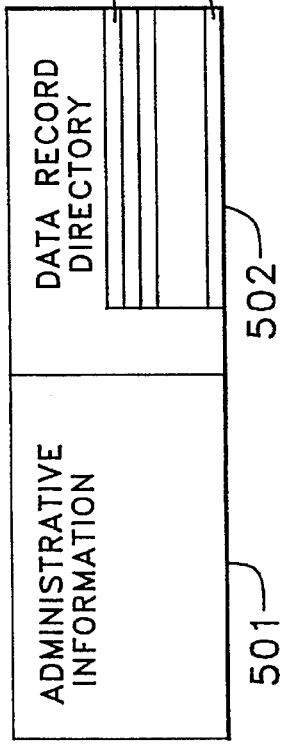

5,487,171

SYSTEM FOR READING AND STOPPING READING DATA FROM MAGNETIC TAPE INTO MEMORY IN RESPONSE TO MOUNT COMMAND AND WRITE COMMAND RESPECTIVELY FROM THE SYSTEM PROCESSOR

FIELD OF THE INVENTION

This invention relates to magnetic tape drives and, in particular, to a preload buffer that is used to store data read from the magnetic tape, during the time period when the tape transport is awaiting a command from the data processor, in anticipation of a data read command from the data processor.

PROBLEM

A magnetic tape drive is connected to a data processor via a data channel and functions to read and write data onto a serial magnetic tape media for the data processor. A significant difficulty with this apparatus is that magnetic tape is a serial media and the time it takes to mechanically position the magnetic tape media under the read/write heads of the tape drive can cause a significant delay in the initiation of the data read and write operations. In operation, the data processor requests the mounting of an identified magnetic tape on the tape drive. Once the magnetic tape is mounted on the tape drive by an operator or a robotic tape library system, the tape drive positions the magnetic tape beginning of tape (BOT) underneath the read/write head. The tape drive then signals "ready" to the data processor to enable the data processor to initiate the data read or write operation. The data processor then transmits commands indicative of the operation to be performed via the data channel to the tape drive. The tape drive accelerates the magnetic tape to operating speed and either the data processor begins transmitting data to the tape drive for writing on the magnetic tape or the tape drive transmits data read from the magnetic tape to the data processor, depending upon the command issued by the data processor. The time delays occasioned by each of these tape setup operations cumulatively represent a significant delay in the data read time. If the command received from the data processor indicates that a tape repositioning is required, the data channel becomes idle and the tape drive mechanically repositions the magnetic tape to the desired location and thence must reinitiate communication with the data processor to begin the desired operation. This sequence of operations can be time consuming and may be further exacerbated by the use of magnetic tapes that contain header dictionary information that is used to manage the data on the magnetic tape media. In this situation, the header information must be retrieved and interpreted by the tape drive to maintain the integrity of the data that is written on the magnetic tape.

There are existing buffer circuits that function to compensate for the difference in speed of operation of the data processor data channel and the read/write head and transfer mechanism of the tape drive. These speed matching buffers however are only operational during a data transfer operation and simply match the read and write speed of the data channel to the tape drive. These speed matching buffers do not provide any performance improvement during the tape load operation since the buffer is not functioning until the data transfer has begun.

Therefore, data processors defer data transfers to existing tape drives until all tape positioning operations are completed and the tape drive is ready to transfer data between the data processor and the physical data storage location presently located under the read/write heads. The media set up time and the exchange of messages between the tape drive and the data processor to regulate the operation thereof represent a performance degradation in the data read/write characteristics of existing tape drives.

SOLUTION

The above described problems are solved and a technical advance achieved in the field by the preload buffer for a magnetic tape drive that functions to emulate the operation of an instantaneously available magnetic tape drive by minimizing the media set up time and the required control message exchange over the data channel found in present tape drives. This is accomplished by the use of a preload buffer and associated control software that is concurrently operational with the media set up process in the tape drive. In response to the mounting of a magnetic tape on the tape drive, the tape drive begins reading data from the magnetic tape into the preload buffer while concurrently signalling the data processor that the tape drive is instantaneously available to read/write data. The data processor can then begin the data transfer operation without incurring the delay occasioned by media set up time. The data that is transferred from magnetic tape is stored in the preload buffer in anticipation of the data processor issuing a data read command. Upon receipt of the data read command, the tape drive reads the data out of the preload buffer to the data processor via the data channel while simultaneously reading data from the magnetic tape into the preload buffer.

If the data processor issues a data write command instead of the anticipated data read command, the tape drive receives the data transmitted by the data processor and stores this data in the preload buffer. The tape drive decelerates the magnetic tape from the presently executing anticipatory data read operation and repositions the magnetic tape for a data write operation. The preload buffer continues to store data received from the data processor while the tape drive is repositioning the magnetic tape and accelerating the magnetic tape for a data write operation.

Thus, the preload buffer minimizes the media set up time regardless of whether the data processor issues a read or write command. The majority of magnetic tape mount operations result in a data read operation and the anticipatory transfer of data to the preload buffer while simultaneously signalling the data processor significantly reduces the effective media set up time.

BRIEF DESCRIPTION OF THE DRAWING

FIG. 4 illustrates the elements contained in the header segment of the magnetic tape;

FIG. 5 illustrates the elements contained in the directory section of the header segment of the magnetic tape;

FIG. 6 illustrates the elements contained in the administrative section of the header segment of the magnetic tape;

DETAILED DESCRIPTION

Tape Drive System Architecture

Figure 3:
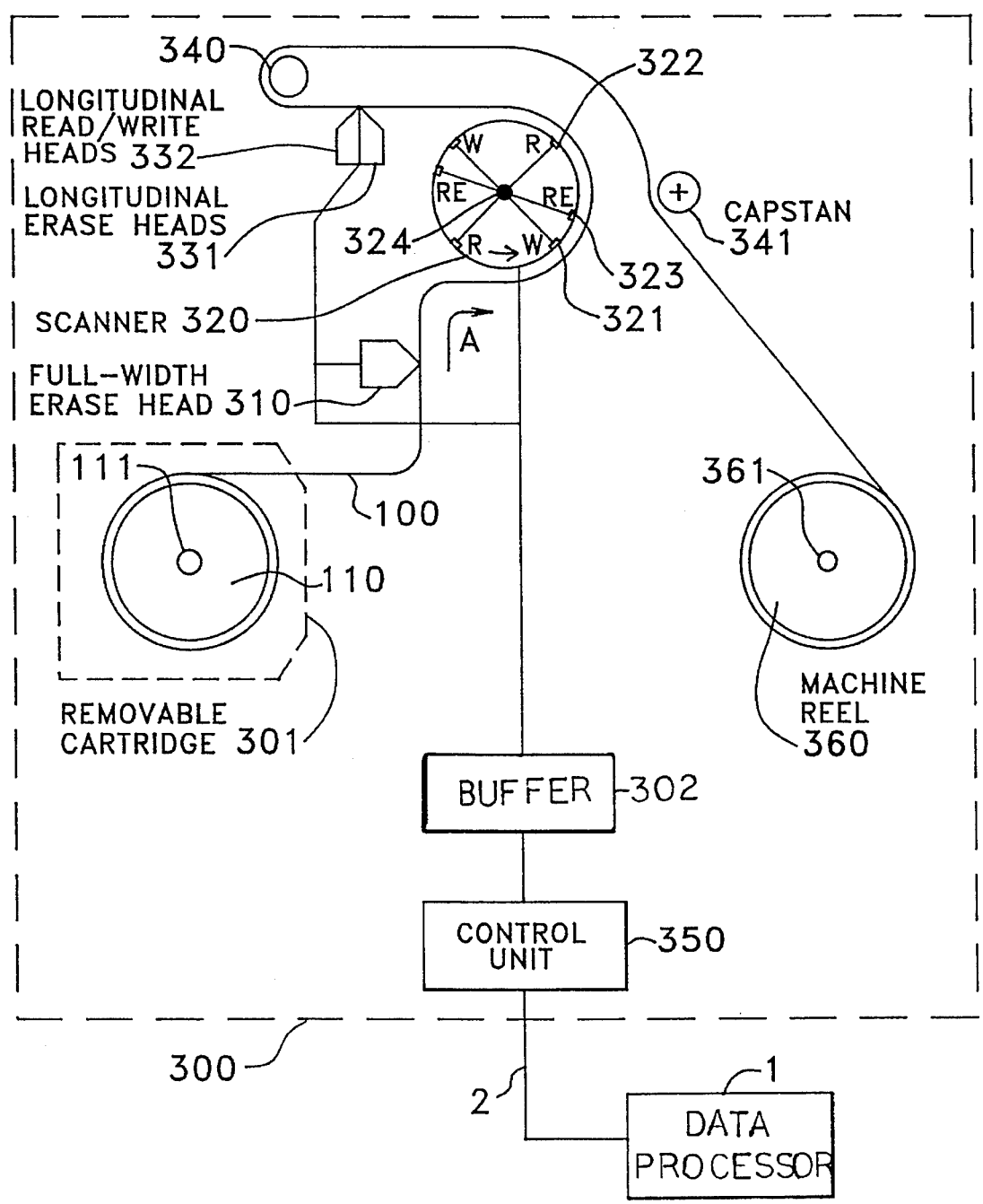
FIG. 3 illustrates in block diagram form the overall architecture of a typical tape drive control unit.

The apparatus illustrated in FIG. 3 represents the tape transport elements found in a tape drive, such as helical scan tape drive 300, that are used to read and write data on magnetic tape 100. The magnetic tape 100 is wound on a single reel 110 which rotates around spindle 111 within magnetic tape cartridge 301. In a helical scan tape drive 300, magnetic tape 100 from magnetic tape cartridge 301 is threaded in direction A past a fixed full width erase head 310, scanner 320 (which contains two pairs of helical read heads 322 and two pairs of helical write heads 321 and one pair of erase heads 323), a fixed longitudinal erase head 331 and a fixed longitudinal read/write head 332. The magnetic tape 100 then passes around guide 340, over capstan 341 to be wound on machine reel 360 which rotates around spindle 361. The full width erase head 310 erases the entire width of magnetic tape 100 and is used when data is recorded on virgin tape. It is also used when data is recorded on a previously used magnetic tape, if none of the data previously recorded on magnetic tape 100 is to be preserved and the entire magnetic tape 100 is overwritten with new data.

Figure 8:
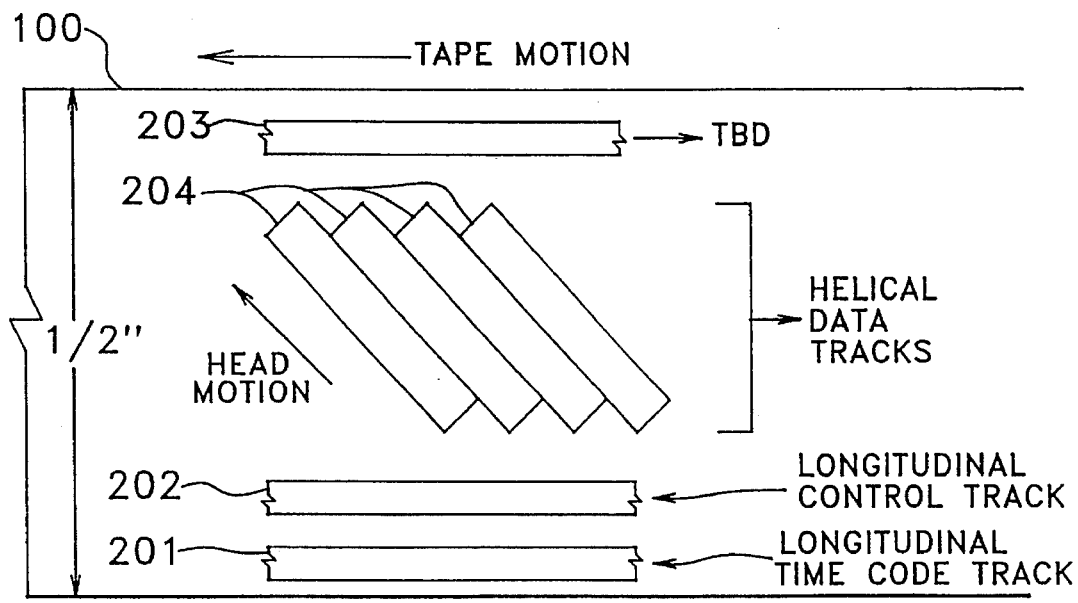
FIG. 8 illustrates the format of data written on the magnetic tape.

Data processor 1 transmits a stream of data records to control unit 350 in tape drive 300, where the data records are formatted for writing in helical scan form as shown in FIG. 8 on magnetic tape 100 via scanner 320. The tape wrap angle around scanner 320 is slightly greater than 180° so that a pair of read heads 322, a pair of write heads 321 and one erase head 323 are constantly in contact with magnetic tape 100 in order to continuously read and write data thereon. The helical write head pairs 321 simultaneously record two tracks 204 of data at a time on magnetic tape 100 with an azimuth angle between adjacent tracks 204 being plus and minus 20°. Similarly, helical read head pairs 322 simultaneously play back two tracks of data at a time from magnetic tape 100. There are also three fixed longitudinal erase 331 and read/write heads 332 to read and write data on the corresponding three longitudinal tracks 201–203 contained on magnetic tape 100: control, time code and one to be determined. These three longitudinal read/write heads 332 can be used individually or in any combination when editing new information into pre-recorded data.

Physical Format of Helical Scan Magnetic Tape

Figure 2:
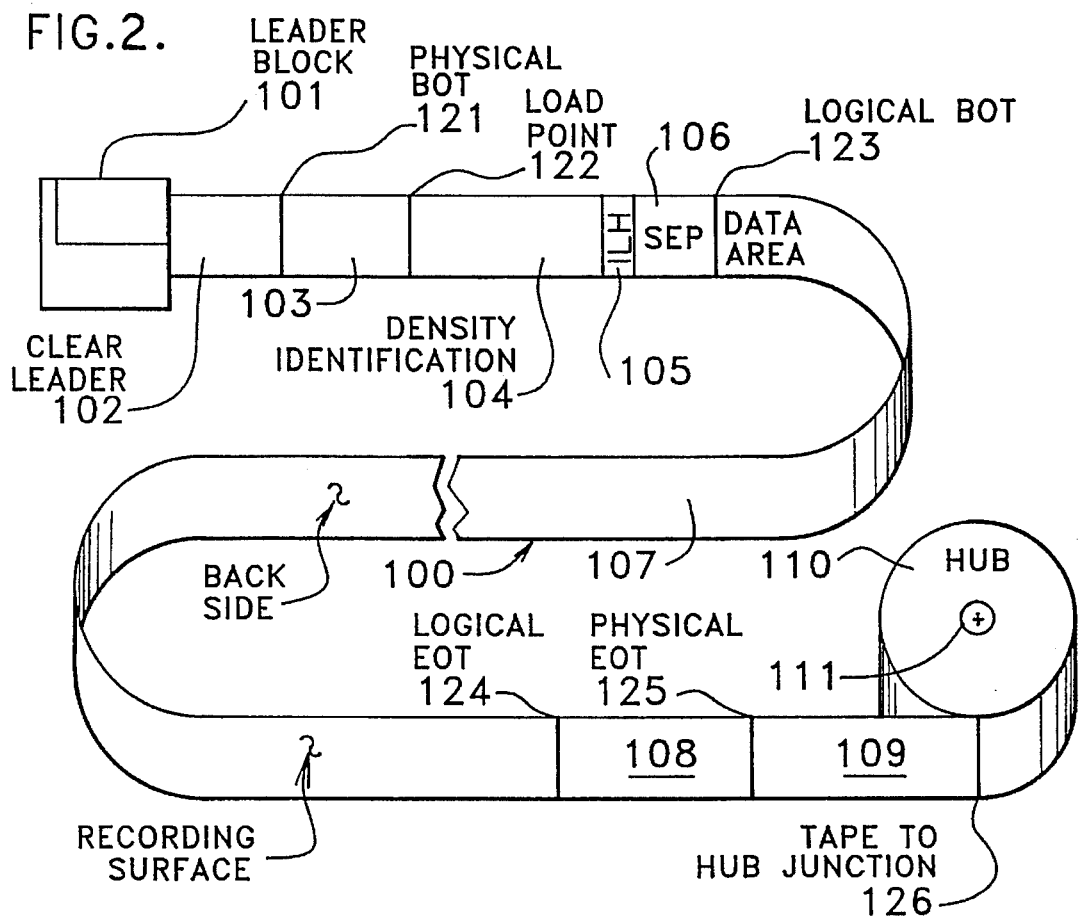
FIG. 2 illustrates the physical format of the magnetic tape media.

FIG. 2 illustrates the physical format of the helical scan magnetic tape 100, including the header segment 105 thereof. The magnetic tape 100 includes a leader block 101 that is attached at one end thereto and a single reel 110 around which magnetic tape 100 is wound into cartridge 301. A length of clear leader 102 is optionally interposed between the physical beginning (BOT) 121 of magnetic tape 100 and leader block 101 in order to protect magnetic tape 100 when it is wound in magnetic tape cartridge 301 around reel 110. A length 103 (typically 3 m) of magnetic tape 100 exists between the physical beginning of tape 121 and a locale, known as the load point 122, at which point the density identification segment 104 of magnetic tape 100 begins. The density identification segment 104 typically consists of 209 scan groups written on magnetic tape 100. The density identification segment 104 represents data, for tape drive control unit 350 to access, indicative of the physical characteristics of magnetic tape 100. Internal leader header segment 105 is located at the end of density identification segment 104 of magnetic tape 100. The internal leader header 105 consists of a three scan groups, the third of which is an ECC scan group to error check the two preceding internal leader header scan groups. The internal leader header 105 is followed by separator segment 106 of magnetic tape 100, which typically consists of 300 scan groups. The separator segment 106 isolates the logical beginning of tape (BOT) 123, which is the start of the data area 107 of magnetic tape 100, from the prepended header information described above. The data area 107 of magnetic tape 100 constitutes the majority of magnetic tape 100 and ends at the logical end of tape 124 which is a predetermined distance from tape to hub junction 126, wherein magnetic tape 100 is affixed to single reel 110 of magnetic tape cartridge 301. A length of trailer tape 109 may be interposed between the physical end (EOT) of tape 125 and tape to hub junction 126. This serves as a method of attaching magnetic tape 100 to reel 110 in order to provide a secure method of attachment thereto.

Internal Leader Header

The internal leader header 105 consists of administrative information which typically includes:

Data Record Directory

Tape mark locations

Read Block ID locations

The record IDs at sub-sector boundaries

Administrative Information

Last scan group that was written (the end scan group)

Location of last Data Scan group written

Number of volume loads

Flag that third level ECC had to be invoked on read (marginal tape should be replaced)

Number of read/write errors for the last x mounts

Serial number of last y drives upon which this cartridge was mounted

Volume ID

Time and data stamp of mount

Tape type and length

Other pertinent information from Event Log and Buffered Log

Safe File information

Manufacturer's ID and Production Batch Numbers

The internal leader header segment 105 of magnetic tape 100 is read on every load of magnetic tape cartridge 301 into a tape drive 300. The internal leader header segment 105 is updated by magnetic tape drive 300 prior to magnetic tape 100 being physically unloaded therefrom in order to update the header information concerning read and write information contained therein. The internal leader header 105 illustrated in FIG. 4 includes two segments: administrative information 501, and data record search directory 502. The data record search directory 502 includes a plurality of entries (502-1 to 502-n), one for each major delimiter (such as: read block ID, sector boundary and tape mark) written on to magnetic tape 100.

Data Record Directory

Each directory entry 502-* includes the information illustrated in FIG. 5. A logical block number 601 is a five byte long field that uniquely identifies every block written on to magnetic tape 100. This block number identifies each successive data record on magnetic tape 100 by a logical block number 601 which represents the logical block number of the previously written data record incremented by one. The second element in each entry is the physical sector field 602 of one byte length, which is the concatenation of the direction bit and segment number used in the LOCATE BLOCK command in 3490E-type tape drives. The third element in the entry is the subsector number 603 which is a one byte field that divides each physical sector into three smaller increments, thereby allowing a high speed portion of a search to position the tape closer to the requested logical block. The fourth element in the entry is a scan group count 604 of four bytes length which represents a unique physical location on magnetic tape 100. Every scan group written on to magnetic tape 100 has a unique scan group number assigned to it in order to identify scan group and differentiate it from all other scan groups written on magnetic tape 100. The fifth element contained in the entry is a file identification number 605 of three bytes which identifies a numerical file in which the scan group is contained. The file identification 605 is used internally in tape drive 300 and is transparent to data processor 1. This file ID number 605 provides a scan group to file correspondence in order to simplify the administering of the data on magnetic tape 100. The sixth element in the entry is a logical scan group count 606 of four bytes that provides an identification of the logical scan group in which this data record is written. The seventh element in the entry is an identification 607 of the type of entry written on magnetic tape 100. The final element in the entry is a reserved field 608 of four bytes for future use.

Administrative Information

FIG. 6 illustrates the information typically contained in the administration information section 501 of internal leader header 105. A first segment of information contained in internal leader header 105 is the volume identification 1001 which consists of seven bytes that represent the volume identification number assigned to magnetic tape cartridge 301. A second section of administrative information 501 is the tape type, which is a two byte long field to indicate whether this is a write protect tape, a tape with no third level ECC, etc. The third segment 1003 of administrative information 501 consists of a one byte indicator of tape length. A fourth segment 1004 of administrative information is the tape manufacturer's identification and production batch number, which consists of 128 bytes of information, to provide the user with information concerning the date of manufacture of this media as well as the identification of the manufacturer and their particular production batch number. This information assists the user in identifying media that has been recalled by the manufacturer or media of a certain class that is more prone to errors than other similar types of media.

Further entries that can be included in administration information 501 are tape drive data 1005 indicative of the number of times that magnetic tape cartridge 301 has been loaded on tape drive 300 and the number of read and write cycles magnetic tape 100 has been subject to. This tape drive data can include the serial number of tape drive 300, as well as date and time stamps to record load activity. Another entry 1006 is a write protect flag byte to indicate write protect status of magnetic tape 100. Further information includes error data 1008 including a flag that indicates that the third level ECC had to be invoked on a read operation thereby indicating that this tape can be marginal and should be replaced by the user. This error data includes a record of the number of read/write errors detected and corrected in the last n times the magnetic tape is mounted on a tape drive as well as the identification of the tape drives upon which this magnetic tape was mounted. The error data 1008 includes a collection of all the error statistics that are produced during the last n mounts in order to enable host computer 1 to access this information in order to determine whether magnetic tape 100 is flawed or whether the associated tape drive 300 on which is was mounted is experiencing regular failures. Finally, additional memory is provided for future use to enable magnetic tape 100 to store predefined information, either selected by the user or defined by the tape drive manufacturer.

Data Record Write to Magnetic Tape

Figure 1:
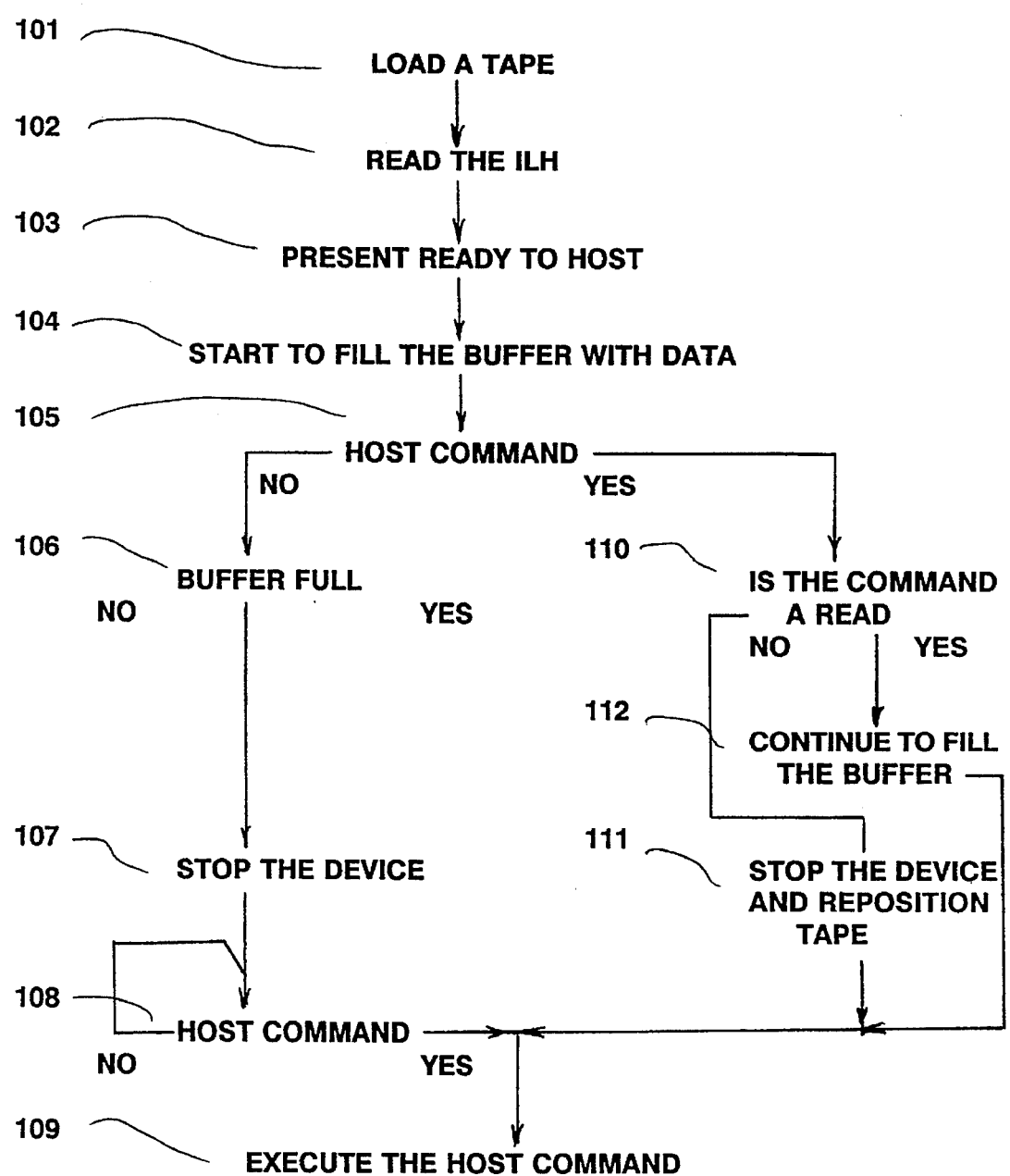
FIG. 1 illustrates in flow diagram form the operational steps taken by the tape drive to preload the buffer memory on a tape mount.

FIG. 1 illustrates in flow diagram form the operational steps taken by tape drive 300 to write data in helical scan form on magnetic tape 100. At step 101, a magnetic tape cartridge 301 is inserted into tape drive 300 and the tape drive mechanism illustrated in FIG. 3 loads the magnetic tape 100 by threading the leader block 101 and magnetic tape 100 through the tape threading path to the takeup reel 360 which rotates around spindle 361. At step 102, magnetic tape 100 is advanced forward in order to enable the tape drive control unit 350 to read the internal leader header 105 written on to this magnetic tape 100 via read heads 322 of scanner 320. If this tape is an unused tape, there is no internal leader header 105 on this magnetic tape 100. If the tape has been previously used, the internal leader header 105 contains the information described above and enables tape drive control unit 350 to determine where on magnetic tape 100 the last data record has been written. At step 103, tape drive control unit 350 presents a ready signal to data processor 1 indicating that tape drive 300 is ready to receive data and commands from data processor 1 via data channel 2. Temporally concurrently with the transmission of the ready signal, at step 104, tape drive control unit 350 begins reading data from magnetic tape 100 into preload buffer 302 in anticipation of the receipt of a data read command from data processor 1. At step 105 tape drive control unit 350 determines whether data processor 1 has transmitted a command via data channel 2. If not, at step 106 tape drive control unit 350 monitors the quantity of data stored in preload buffer 302. If the buffer 302 in full, at step 107 tape drive control unit 350 stops reading data from magnetic tape 100 and awaits at step 108 the receipt of a command from data processor 1. Once a command is received, at step 109 tape drive control unit 350 executes the received command.

If the preload buffer 302 is not full at step 106, processing returns to step 105. Steps 105–106 are executed until either preload buffer 302 fills or a command is received from data processor 1. If at step 105 a command is received from data processor 1, tape drive control unit 350 interprets the command at step 110. If the received command is a read command, at step 112 tape drive control unit 350 continues to fill preload buffer 302 and proceeds at step 109 to execute the received read command by transmitting data from preload buffer 302 to data processor 1 via data channel 2. If at step 110 the received command is determined not to be a read command, the presently executing read operation is terminated at step 111 and the received command is executed at step 109.

Data processor 1 transmits data over data channel 2 that interconnects it to tape drive 300 and the data is written into buffer 302. As the data is written into buffer 302, tape drive control unit 350 checks for errors to make sure there are no transmission errors in the data received from data processor 1. Since tape drive 300 can typically write data to magnetic tape 100 faster than data processor 1 can write the data into buffer 302, tape drive control unit 350 waits for data processor 1 to complete its data transmission and checks for errors before presenting the proper ending status to data processor 1 indicating that the data records have been written.

Preload Buffer Operation for Tape Motion Commands

Figure 7:
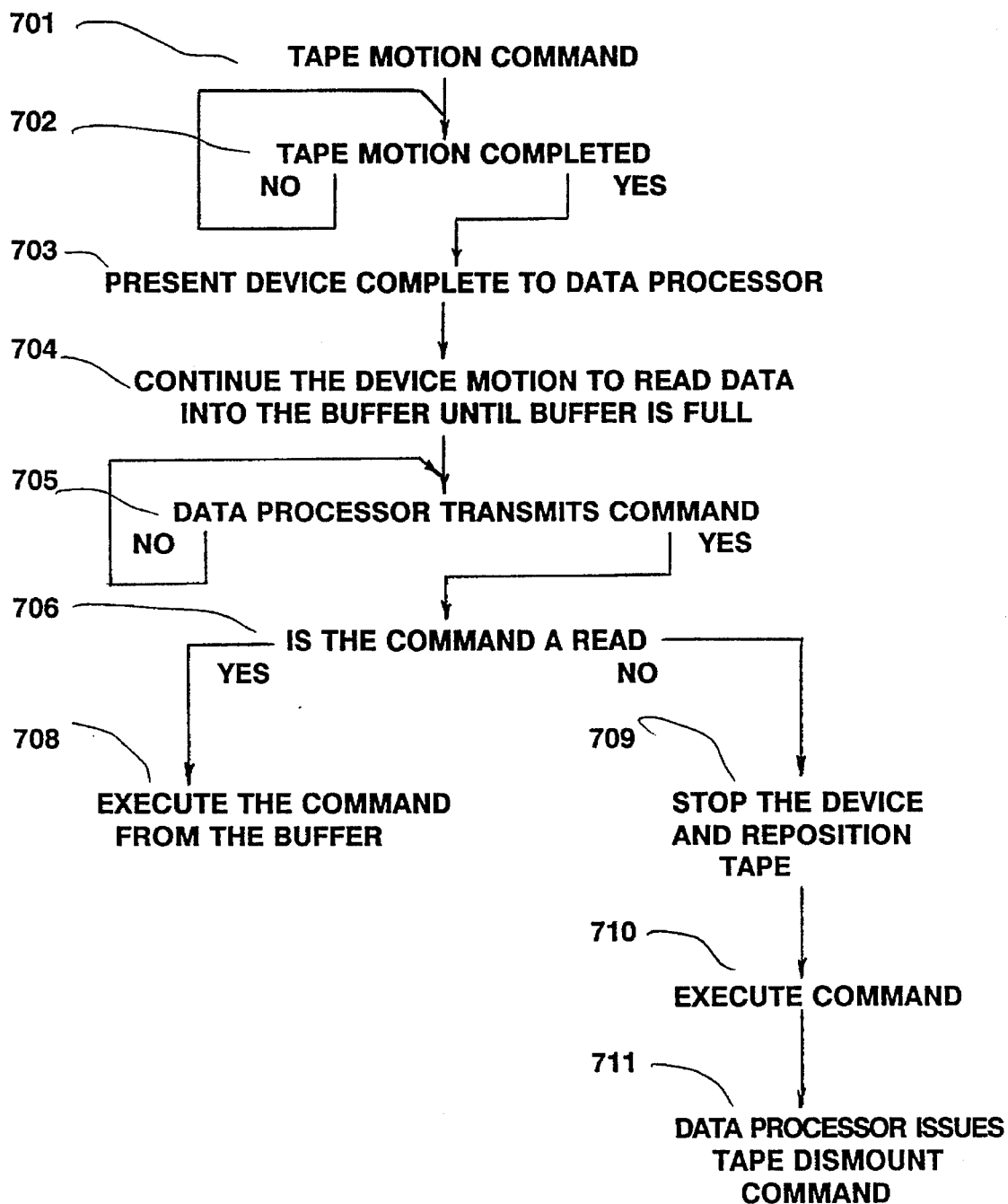
FIG. 7 illustrates in flow diagram form the operational steps taken by the tape drive in response to a succession of data processor commands.

FIG. 7 illustrates in flow diagram form the operation of the preload buffer 302 when tape motion commands are received from data processor 1. At step 701, tape drive 300 receives a tape motion command (such as a locate block or space file command) from data processor 1 and executes the command. At step 702, tape drive control unit 350 determines whether the tape motion is completed. If not, tape drive control unit 350 continues to monitor the activity in tape drive 300 to determine when the motion of magnetic tape 100 has been completed. When tape drive control unit 350 finally determines that tape motion is completed at step 702, processing advances to step 703. In this context, the tape motion is completed when the particular physical location on magnetic tape 100 that is designated in the received tape motion command is reached. Tape drive control unit 350 determines at step 702 that the tape motion is completed and at step 703 tape drive control unit 350 presents a device complete to data processor 1 via the data channel 2. At step 704, tape drive control unit 350, temporally concurrently with the above noted device complete command transmission, continues motion of magnetic tape 100 to read data into preload buffer 302 in anticipation of data processor 1 now transmitting a data record read command. While tape drive control unit 350 is loading preload buffer 302 with data read from magnetic tape 100, tape drive control unit 350 monitors data channel 2 at step 705 to determine whether a command has been received over data channel 2. Step 705 is repeatedly executed by tape drive control unit 350 until a command is received and at step 706, tape drive control unit 350 determines the content of the received command. If the received command is not a read command, at step 709 tape drive control unit 350 stops the tape motion, and repositions the magnetic tape 100. At step 710, tape drive control unit 350 interprets the contents of the received command and executes the command. If, however, at step 706, tape drive control unit 350 determines that the received command is a read command, processing advances to step 708 by executing the read command from preload buffer 302. Tape drive control unit 350 accomplishes this by reading data out of the preload buffer 302 to data processor 1 via data channel 2 and concurrently continuing to read data from magnetic tape 100 into preload buffer 302 to maintain preload buffer 302 full of data. The execution of the received command at step 708 or 710 takes place and processing returns to step 702 where tape drive control unit 350 again monitors the activity in tape drive 300 to determine when execution of the received command has been completed.

In this manner, the preload buffer 302 not only increases the tape mount efficiency of tape drive 300 but also increases the efficiency to access successively read data records on magnetic tape 100. Once no more commands are received from data processor 1, this is determined at step 711 wherein data processor 1 issues a tape dismount command at which time magnetic tape 100 is rewound to its beginning and internal leader header 105 is rewritten with updated information concerning the physical location and identity of any data records that have just been written on to magnetic tape 100. In addition, tape drive control unit 350 writes updated information into the administrative information section 501 of internal leader header 105.

While a specific embodiment of this invention has been disclosed, it is expected that those skilled in the art can and will design alternate embodiments of this invention that fall within the scope of the appended claims.

We claim:

1. In a magnetic tape drive reads and writes a stream of data records, received from e data processor, on a mountable magnetic tape, apparatus operationally independent of said data processor for prestalling data records written on said mountable magnetic tape media for said dam processor, comprising:

memory means for storing data records being transmitted between said data processor and said mountable magnetic tape;

means, responsive to a mountable magnetic tape requested by said data processor being mounted in said tape drive element, for transmitting control signals to said data processor indicative of the availability of said mountable magnetic tape on said tape drive;

means for reading data records from said mountable magnetic tape into said memory means concomitantly with said control signals being transmitted to said data processor;

means, responsive to the receipt of a read magnetic tape command from said data processor, for transmitting said read data records from said memory means to said data processor;

means, responsive to a mountable magnetic tape requested by said data processor being mounted in said tape drive and receipt of a write mountable magnetic tape command from said data processor, for disabling said reading means;

means for storing data records received from said data processor in said memory means; and means, responsive to said mountable magnetic tape reaching magnetic tape write speed and position, for writing data records received from said data processor and stored in said memory means on to said mountable magnetic tape.

2. The apparatus of claim 1 further comprising:

means for disabling said reading means when said memory means is full of said data records.

3. The apparatus of claim 1 further comprising:

means for disabling said reading means in response to the receipt of a command from said data processor exclusive of said read magnetic tape command.

4. The apparatus of claim 1 further comprising:

means, responsive to the receipt of a read magnetic tape command from said data processor, for maintaining said reading means active to transfer data records from said rewriteable media to said memory means until an end of file location, as specified by said data processor in said read magnetic tape command, is reached.

5. The apparatus of claim 1 wherein said mountable magnetic tape has a header written thereon for storing administrative data specific to each of said data records written on said mountable magnetic tape, said control signal transmitting means comprises:

means, responsive to a mountable magnetic tape requested by said data processor being mounted in said tape drive, for reading said header written thereon;

means, responsive to the completion of said header reading, for transmitting control signals to said data processor indicative of the availability of said mountable magnetic tape on said tape drive.

6. In a magnetic tape drive that reads and writes a stream of data records, received from a data processor, on a mountable magnetic tape, a method operationally independent of said data processor for prestaging data records written on said mountable magnetic tape into a memory that stores data records being transmitted between said data processor and said mountable magnetic tape, comprising the steps of:

transmitting, in response to a mountable magnetic tape requested by said data processor being mounted in said tape drive element, control signals to said data processor indicative of the availability of said mountable magnetic tape on said tape drive;

reading data records from said mountable magnetic tape into said memory concomitantly with said control signals being transmitted to said data processor;

transmitting, in response to the receipt of a read magnetic tape command from said data processor, said read data records from said memory to said data processor;

disabling in response to a mountable magnetic tape requested by said data processor being mounted in said tape drive and receipt of a write mountable magnetic tape command from said data processor, said step of reading;

storing data records received from said data processor in said memory; and writing, in response to said mountable magnetic tape reaching magnetic tape write speed and position, data records received from said data processor and stored in said memory on to said mountable magnetic tape.

7. The method of claim 6 further comprising the step of:

disabling said step of reading when said memory is full of said data records.

8. The method of claim 6 further comprising the step of:

disabling said step of reading in response to the receipt of a command from said data processor exclusive of said read rewriteable media command.

9. The method of claim 6 further comprising the step of:

maintaining, in response to the receipt of a read magnetic tape command from said data processor, said step of reading active to transfer data records from said magnetic tape said memory until an end of file location, as specified by said data processor in said read magnetic tape command, is reached.

10. The method of claim 6 wherein said mountable magnetic tape has a header written thereon for storing administrative data specific to each of said data records written on said mountable magnetic tape, said step of transmitting control signals comprises:

reading, in response to a mountable magnetic tape requested by said data processor being mounted in said tape drive, said header written thereon;

transmitting, in response to the completion of said header reading, control signals to said data processor indicative of the availability of said mountable magnetic tape on said tape drive.

11. In a magnetic tape drive that reads and writes e stream of data records, received from a data processor, on a mountable magnetic tape, apparatus operationally independent of said data processor for prestaging data records written on said mountable magnetic tape for said data processor, comprising:

memory means for storing data records being transmitted between said data processor and said mountable magnetic tape;

means, responsive to a mountable magnetic tape requested by said data processor being mounted in said tape drive, wherein said magnetic tape has a header written thereon for storing administrative data specific to each of said data records written on said magnetic tape, for reading said header written thereon;

means, responsive to the completion of said header reading, for transmitting control signals to said data processor indicative of the availability of said mountable magnetic tape on said tape drive;

means for reading data records from said mountable magnetic tape into said memory means with said control signals being transmitted to said data processor; and means, responsive to the receipt of a read magnetic tape command from said data processor, for transmitting said read data records from said memory means to said data processor.

12. The apparatus of claim 11 further comprising:

means for disabling said reading means when said memory means is full of said data records.

13. The apparatus of claim 11 further comprising:

means for disabling said reading means in response to the receipt of a command from said data processor exclusive of said read mountable magnetic tape command.

14. The apparatus of claim 11 further comprising:

means, responsive to a mountable magnetic tape media requested by said data processor being mounted in said tape drive and receipt of a write mountable magnetic tape command from said data processor, for disabling said reading means;

means for storing data records received from said data processor in said memory means; and means, responsive to said mountable magnetic tape reaching magnetic tape write speed and position, for writing data records received from said data processor and stored in said memory means on to said mountable magnetic tape.

15. In a magnetic tape drive that reads and writes a stream of data records, received from a data processor, on a mountable magnetic tape, a method operationally independent of said data processor for prestaging data records written on said mountable magnetic tape in a memory that stores data records being transmitted between said data processor and said mountable magnetic tape; for said data processor comprising the steps of:

reading, in response to a mountable magnetic tape requested by said data processor being mounted in said tape drive, wherein said magnetic tape has a header written thereon for storing administrative data specific to each of said data records written on said magnetic tape said header written thereon;

transmitting, in response to the completion of said header reading, control signals to said data processor indicative of the availability of said mountable magnetic tape on said tape drive;

reading data records from said mountable magnetic tape into said memory concomitantly with said control signals being transmitted to said data processor; and transmitting, in response to the receipt of a read magnetic tape command from said data processor, said read data records from said memory to said data processor.

16. The method of claim 15 further comprising the step of:

disabling said step of reading when said memory is full of said data records.

17. The method of claim 15 further comprising the step of:

disabling said step of reading in response to the receipt of a command from said data processor exclusive of said read mountable magnetic tape command.

18. The method of claim 15 further comprising the steps of:

disabling, in response to a mountable magnetic tape media requested by said data processor being mounted in said tape drive and receipt of a write mountable magnetic tape command from said data processor, said step of reading;

storing data records received from said data processor in said memory; and writing, in response to said mountable magnetic tape reaching magnetic tape write speed and position, data records received from said data processor and stored in said memory on to said mountable magnetic tape.

* * * * *